United States Patent
Keruzore

(10) Patent No.: US 11,905,883 B2
(45) Date of Patent: Feb. 20, 2024

(54) FUEL SUPPLY CIRCUIT FOR A COMBUSTION CHAMBER OF A TURBOMACHINE

(71) Applicant: SAFRAN AIRCRAFT ENGINES, Paris (FR)

(72) Inventor: Nicolas Marie Keruzore, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/758,997

(22) PCT Filed: Jan. 13, 2021

(86) PCT No.: PCT/FR2021/050052
§ 371 (c)(1),
(2) Date: Jul. 18, 2022

(87) PCT Pub. No.: WO2021/148738
PCT Pub. Date: Jul. 29, 2021

(65) Prior Publication Data
US 2023/0029859 A1 Feb. 2, 2023

(30) Foreign Application Priority Data

Jan. 21, 2020 (FR) ........................ 2000578

(51) Int. Cl.
*F02C 7/00* (2006.01)
*F02C 7/22* (2006.01)
(Continued)

(52) U.S. Cl.
CPC ............. *F02C 7/222* (2013.01); *F02C 7/224* (2013.01); *F23R 3/28* (2013.01); *F05D 2260/607* (2013.01)

(58) Field of Classification Search
None
See application file for complete search history.

(56) References Cited

U.S. PATENT DOCUMENTS 4,262,482 A * 4/1981 Roffe ...................... F23R 3/30
60/39.463
2004/0194627 A1 10/2004 Huang et al.
(Continued)

FOREIGN PATENT DOCUMENTS

FR 2918716 A1 1/2009
FR 2925146 A1 6/2009
(Continued)

OTHER PUBLICATIONS

International Search Report received for PCT Patent Application No. PCT/FR2021/050052, dated Jun. 22, 2021, 5 pages (2 pages of English Translation and 3 pages of Original Document).

Primary Examiner — Edwin Kang
(74) Attorney, Agent, or Firm — WOMBLE BOND DICKINSON (US) LLP

(57) ABSTRACT

The invention relates to a fuel supply circuit (1) for a combustion chamber (2) of a turbomachine (10), comprising: —a fuel supply pump (3) configured to provide a fuel flow at a predetermined flow rate, —a plurality of fuel injectors (4), and —a ramp (5) for connecting the pump (3) to the injectors (4), said circuit further comprising a device for the heat treatment of the fuel (6), having a chamber (60) connected to a fuel inlet (61) linked to the pump (3) and to a fuel outlet (62) linked to the ramp (5), wherein heating elements (60) are located in said chamber and are configured to heat the fuel flow to a predetermined temperature so as to cause coking of the fuel within the chamber (60) of the device (6).

14 Claims, 3 Drawing Sheets

(51) Int. Cl.
*F02C 7/224* (2006.01)
*F23R 3/28* (2006.01)

(56) References Cited

U.S. PATENT DOCUMENTS

| | | | |
|---|---|---|---|
| 2011/0057056 A1* | 3/2011 | Ziminsky | F23D 14/48 |
| | | | 239/398 |
| 2013/0045450 A1* | 2/2013 | Uhm | F23R 3/26 |
| | | | 431/198 |
| 2015/0048617 A1* | 2/2015 | Veilleux, Jr. | F02C 7/224 |
| | | | 165/103 |
| 2016/0281656 A1* | 9/2016 | Alecu | F02C 7/14 |
| 2016/0311552 A1* | 10/2016 | Fausett | B64D 37/34 |
| 2018/0016024 A1* | 1/2018 | Stearns | B64D 27/16 |
| 2018/0111063 A1 | 4/2018 | Tongue et al. | |
| 2019/0024897 A1* | 1/2019 | Prociw | F02C 7/222 |
| 2019/0186365 A1* | 6/2019 | Lowery | H05H 1/2441 |
| 2020/0088098 A1* | 3/2020 | Roberge | F02C 7/16 |

FOREIGN PATENT DOCUMENTS

| | | | |
|---|---|---|---|
| FR | 2941288 A1 | 7/2010 | |
| FR | 2945837 A1 | 11/2010 | |
| FR | 2975467 A1 | 11/2012 | |

* cited by examiner

FUEL SUPPLY CIRCUIT FOR A COMBUSTION CHAMBER OF A TURBOMACHINE

TECHNICAL FIELD OF THE INVENTION

The present invention relates to a fuel supply circuit for a combustion chamber of a turbomachine, in particular for an aircraft. It concerns in particular an improvement allowing to avoid the coking of the fuel in the injectors equipping the combustion chamber.

TECHNICAL BACKGROUND

The prior art comprises in particular the documents US-A1-2018/111063 and US-A1-2004/194627.

An aircraft turbomachine comprises a gas generator comprising in particular one or more compressors, for example low-pressure and high-pressure, arranged upstream of a combustion chamber.

By convention, in this application, the terms "upstream" and "downstream" are defined in relation to the direction of flow of the gases in the turbomachine. Also, by convention in the present application, the terms "internal" and "external" are defined radially with respect to the longitudinal axis of the turbomachine, which is in particular the axis of rotation of the rotors of the compressors.

Traditionally, the combustion chamber is annular and placed in an annular enclosure delimited radially by an external annular casing and an internal annular casing. The combustion chamber comprises coaxial internal and external annular walls joined upstream by a chamber bottom, also annular, and substantially transverse.

The combustion chamber is supplied with compressed air from the high-pressure compressor via in particular an annular diffuser, and with fuel via a fuel supply circuit comprising injectors distributed angularly around the axis of the turbomachine.

Conventionally, the fuel supply circuit may comprise the following elements listed here in the direction of fuel flow from upstream to downstream: a fuel reservoir for storing the fuel, a low-pressure pump LP ensuring the supply of the fuel from the reservoir, a filtration unit of the fuel, a high-pressure pump HP, a unit for metering the total fuel flow delivered to the injectors, usually referred to as FMU (Fuel Metering Unit), delivering at the outlet a total fuel flow which may be distributed downstream between one or more injection ramps, and a set of fuel injectors in the combustion chamber.

The supply circuit generally uses kerosene or bio-kerosene as fuel. Kerosene is a mixture of hydrocarbons containing mainly alkanes. It is derived from the refining of the petroleum and is theoretically free of sulphur. Bio-kerosene is an alternative fuel, produced from biomass, such as sugar cane. These fuels present in reality, a propensity to oxidation and pyrolysis when they are subjected to temperatures higher than 150° C. Also, the presence of oxygen dissolved in kerosene and sulphur compounds, leads to the decomposition of the latter into various reaction products at the origin of the deposit and the clogging of the hydromechanical systems. These conditions of fuel degradation are regularly met during the passage of kerosene in the injectors.

The applications FR-A1-2 918 716, FR-A1-2 925 146, FR-A1-2 941 288, and FR-A1-2 975 467 describe examples of an injection system comprising injectors for turbomachine.

These injectors, which are generally located at the level of the chamber bottom, are subject to intense thermal stresses, particularly at idle or shutdown points of the turbomachine. When these operating points are seen too frequently, the degradation of the fuel can cause fuel coke deposits to form on the walls of the injectors. This deposit can, in the long term, degrade the injection performance and therefore the general performance of the turbomachine.

The main parameters acting on the coking phenomenon are the temperature of the fuel in the wall, and the concentrations of reagents at the origin of the deposit precursors.

One solution to this coking phenomenon is to realize a thermal protection on the body and the bend of the injectors, so as to lower the temperature levels on the internal wall of the injector at the operating points of the engine when the fuel flow is through the injectors. However, at the idle or shutdown points of the turbomachine, when the fuel flow is very low or no longer flowing, the thermal protections do not allow to prevent the temperature of the injectors from rising above the critical deposit formation temperatures.

An alternative to this coking phenomenon is to clean the ramps and the injectors with a cleaning solution. A movable carriage comprising a reservoir filled with cleaning solution is conveyed to the combustion chamber, the cleaning solution then being injected into the injectors when the turbomachine is at a standstill. This alternative allows to directly remove a portion of the coke deposit in fuel when the turbomachine is at a standstill on the ground, without dismantling the engine and the injectors. However, the coke particles dissolved or resulting from the pickling from the cleaning can clog the injector or degrade it permanently. On the other hand, this cleaning process is costly, as it is only done when the turbomachine is under maintenance, and requires frequent and regular checks throughout the life of the turbomachine.

It is also known to use anti-coking coatings on the walls of the injectors. However, these coatings are not a sufficiently effective solution to limit the fuel deposition in the injectors and to prevent a premature maintenance of the turbomachine. These coatings allow, at best, to improve the efficiency of the cleaning products of the turbomachine during maintenance.

In this context, it is interesting to overcome the disadvantages of the prior art, by proposing a fuel supply circuit for a combustion chamber that is reliable and has an improved service life, while allowing its simple and rapid assembly in a turbomachine.

SUMMARY OF THE INVENTION

The invention relates to a fuel supply circuit for a combustion chamber of a turbomachine, in particular for an aircraft, comprising:
a fuel supply pump, said pump being configured to provide a flow of fuel at a predetermined flow rate,
a plurality of fuel injectors, and
a ramp for connecting the pump to the injectors.

According to the invention, the circuit further comprises a device for the thermal treatment of the fuel comprising a chamber connected, on the one hand, to a fuel inlet connected to the pump, and on the other hand, to a fuel outlet connected to the ramp, heating elements being located in this chamber and being configured to heat the fuel flow provided by the pump up to a predetermined temperature so as to cause a coking of the fuel within the chamber.

According to the invention, said heating elements comprise at least one perforated metal tube which comprises fuel passage orifices and which is associated with a heating electrode for heating the tube and thus the fuel passing through the tube.

The invention allows, thanks to the presence of the fuel thermal treatment device, to cause the formation and the deposition of fuel coke in a localized area of the supply circuit, preferably remote from the combustion chamber. This area is located downstream of the fuel supply pump and upstream of the injector connection ramp. This allows the formation of fuel deposits and clogging in the device to be easily controlled without affecting the performance of the fuel equipment (such as the injectors), and generally the performance of the turbomachine. In fact, the fuel flow leaving the pump is degraded and oxidized by heating in the chamber of the device. The oxidation reaction reagents of the fuel (the dissolved oxygen and the sulphur precursors) are therefore consumed before they reach the injectors. Thus, the fuel (which is free of its reaction products) can pass through the injectors without clogging them, even under the high thermal stresses and the temperature coking conditions are met.

In general, the device of the invention allows the thermal treatment of the fuel to be centralized on the turbomachine. In particular, the fuel coking is displaced upstream of the injectors to an area that is easily accessible during a maintenance. This allows to increase the service life of the injectors, whose replacement is a heavy and expensive operation, and consequently reduces the risk of premature removal of the turbomachine containing the injection system.

The invention thus has the advantage of proposing a simple design, offering very high reliability, and with little penalty in terms of cost and overall dimension requirements for the turbomachine.

The system according to the invention may comprise one or more of the following characteristics, taken alone or in combination with each other:
- a conduit for bypassing said device, which conduit extends between the pump and the ramp and allows a fuel flow to leave the pump and to supply the ramp without passing through said device,
- the bypass conduit is equipped with a valve, for example a flap valve, which is configured to adopt, on the one hand, an open position in which the fuel flow passing through the conduit is maximum, and on the other hand, a closed position in which this flow is zero,
- the circuit further comprises a fuel metering unit which is connected to said device and which is configured to control said heating elements,
- said unit is configured to control the valve as a function of a parameter of the fuel flow provided by the pump, such as the pressure of the fuel flow,
- each of said heating elements comprises metal tubes coaxially engaged in each other,
- the or each tube comprises a wall formed by a metal mesh or metal screen,
- at least one fuel seal, preferably made of ceramic, and/or dielectric seal, is arranged between said metal meshes or screens of the heating elements,
- the device comprises means for cooling the fuel flow leaving the chamber or the bypass conduit,
- the device is releasably connected to the pump and the ramp,
- the device is configured to be attached to a casing of the combustion chamber by attachment means, preferably removable, such as bolts,
- the orifices of the tube or the tubes have a diameter between 0.1 and 1 mm,
- the heating elements are configured to provide a heating temperature of between 200 and 300° C., preferably in the range of 250° C.

The invention also relates to a turbomachine, in particular for an aircraft, comprising a fuel thermal treatment device as described above.

The turbomachine may be a turboprop engine or a turbojet engine.

The invention also relates to a method for supplying fuel to a turbomachine combustion chamber, by means of a fuel thermal treatment device as described above. This method comprises a step of controlling the heating elements to heat the fuel only when a parameter of the fuel flow provided by the pump is below a predetermined threshold.

The invention also relates to a method for maintaining a fuel supply circuit of a turbomachine combustion chamber, in particular for an aircraft, the circuit comprising a fuel thermal treatment device as described above. This maintenance method comprises a step of dismantling and replacing the device comprising a chamber clogged with fuel coke deposits, by a new device.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

In general, in the following description, the terms "longitudinal" and "axial" refer to the orientation of structural elements extending in the direction of a longitudinal axis X. This axis X may be coincident with an axis of rotation of a rotor of a turbomachine. The terms "radial" or "vertical" refer to an orientation of structural elements extending in a direction perpendicular to the axis X. The terms "inner" and "outer", and "internal" and "external" are used in reference to a positioning relative to the axis X. Thus, a structural element extending along the axis X comprises an inner face oriented towards the axis X and an outer surface opposite its inner surface. In the present application, the terms "upstream" and "downstream" are defined with respect to the direction of flow of the gases in the turbomachine.

Figure 1:
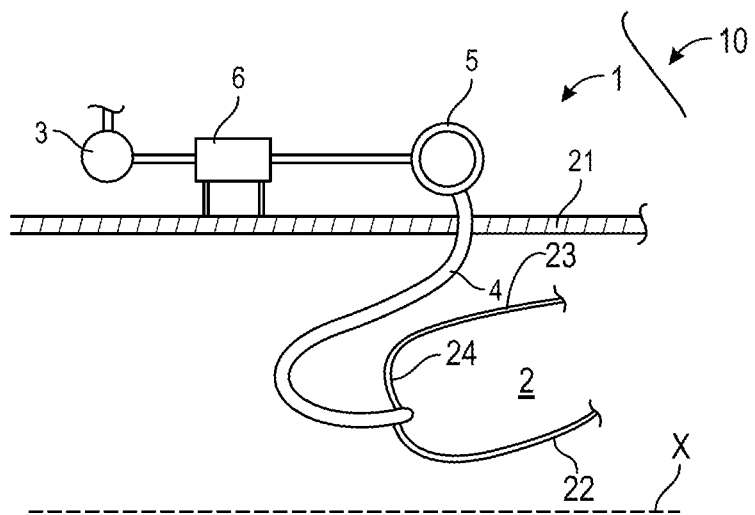
FIG. 1 is a schematic half-view in axial cross-section of a fuel supply circuit for a combustion chamber of a turbomachine.

FIG. 1 shows an annular combustion chamber 2 of a gas generator of a turbomachine 10, preferably for an aircraft.

The combustion chamber 2 is located downstream of one or more compressors, e.g. low-pressure and high-pressure, and upstream of one or more turbines, e.g. high-pressure and low-pressure (not shown in FIG. 1).

The combustion chamber 2 is part of a turbomachine 10 having a longitudinal axis X which is in particular the axis of rotation of the rotors of the compressors and turbines.

The combustion chamber 2 is placed in an annular enclosure delimited radially by an external annular casing 21 and an internal annular casing (not shown).

The combustion chamber 2 comprises coaxial internal 22 and external 23 annular walls joined upstream by an annular and substantially transverse chamber bottom 24.

The combustion chamber 2 is supplied with compressed air by the high-pressure compressor via an annular diffuser (not shown in the Figure), and with fuel via a fuel supply circuit 1.

In FIG. 1, the fuel supply circuit 1 comprises:
- a fuel supply pump 3 configured to provide a fuel flow F1 at a predetermined flow rate,
- injection devices or injectors 4 opening into the combustion chamber 2, and
- a ramp 5 for connecting the pump 3 to the injectors 4.

One of the particularities of the invention is that the circuit 1 also comprises a fuel thermal treatment device 6. The device 6 is located downstream the pump 3 and upstream the ramp 5 and the injectors 4. The device 6 can be releasably attached to the external casing 23 by fasteners (such as bolts).

Figure 2:
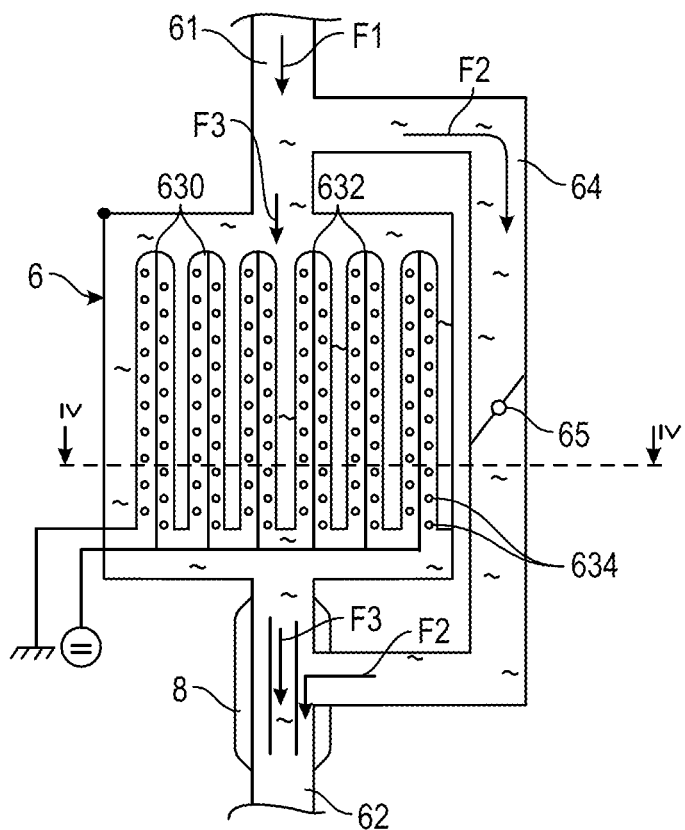
FIG. 2 is a partial schematic view of a fuel supply circuit according to one embodiment of the invention, and shows a thermal treatment device and a bypass conduit.
Figure 3:
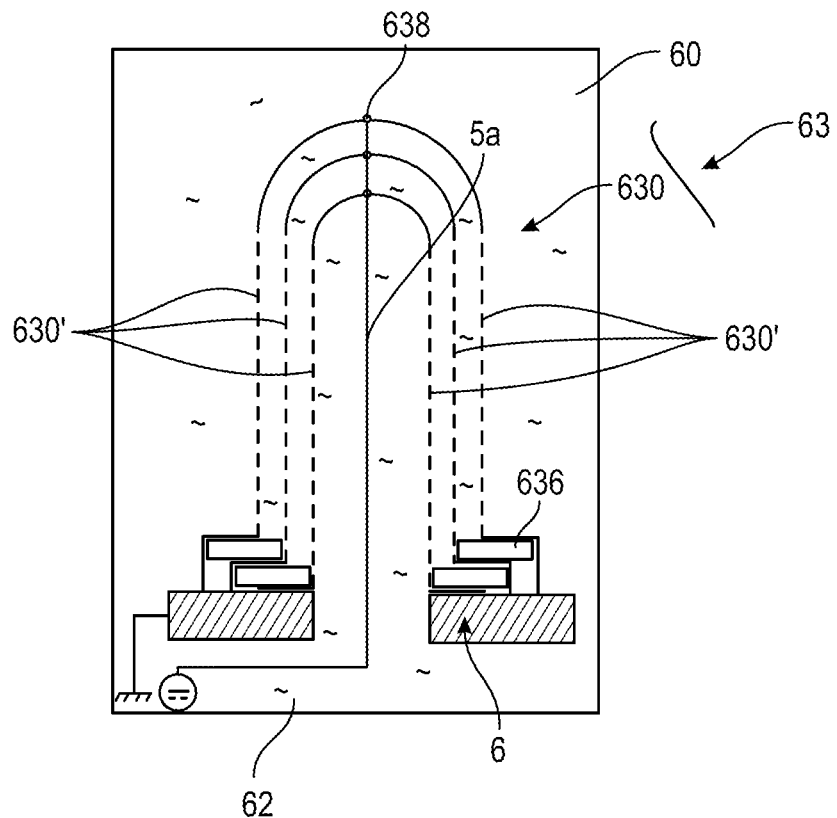
FIG. 3 is a schematic cross-sectional view of a heating element of the device in FIG. 2.

With reference to FIGS. 2 and 3, the device 6 comprises a chamber 60 connected, on the one hand, to a fuel inlet 61, and on the other hand, to a fuel outlet 62. The fuel inlet 61 and outlet 62 may be a flow conduit of the fuel. In the example, and not limitation, the chamber 60 has a general parallelepiped shape.

The chamber 60 comprises heating elements 63. These elements 63 comprise at least one tube 630 associated with at least one heating electrode 632 adapted to heat the tube 630. The electrode 632 may be arranged coaxially with the tube 630. The tube 630 comprises fuel passage orifices 634. In FIGS. 2 and 3, the chamber 60 comprises six cylindrical tubes 630 that are arranged longitudinally with respect to the axis X and parallel to each other. The tubes 630 of the chamber 60 may also be arranged vertically with respect to the axis X.

Figure 4:
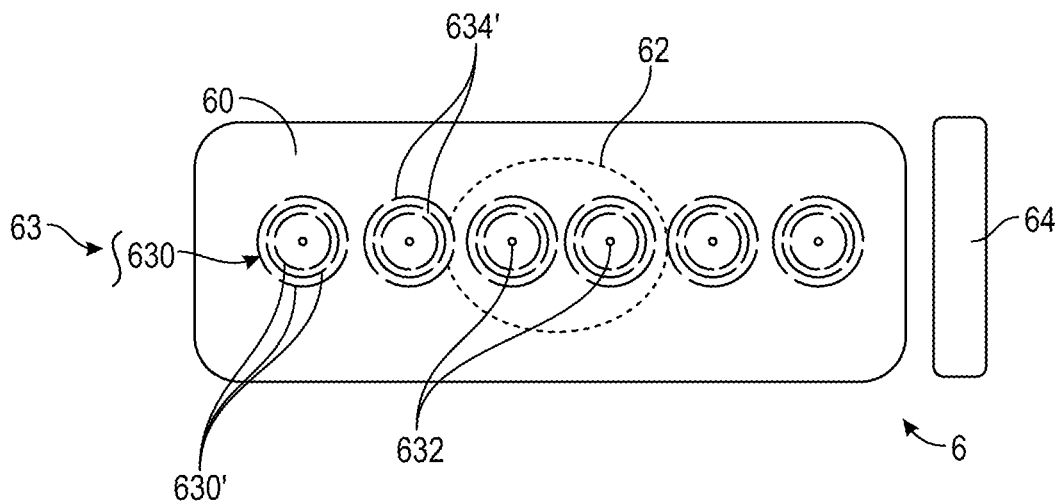
FIG. 4 is a schematic cross-sectional view along the line IV-IV of FIG. 2.

With reference to FIGS. 3 and 4, each tube 630 is formed of at least three sub-tubes 630' which may be coaxial or concentric with each other. The sub-tubes 630' may be perforated and comprise orifices 634'. In FIG. 4, the tubes 630 are coaxial and each tube 630 is formed of three concentric sub-tubes 630'. In particular, the sub-tubes 630' allow for a plurality of levels of filtration and fuel deposition in the chamber 60.

In FIG. 3, the sub-tubes 630' are connected to each other in a fuel-tight manner by a seal 636 which may be made of a dielectric material. For example, a ceramic seal 636 allows to withstand a strong thermal gradient. In the example, the electrode 632 is arranged generally in the centre of the tube 630. The electrode 632 may be connected to the sub-tubes 630' by a metal seal 638.

The tube 630 can be made of a metallic material, such as stainless steel. The tube 630 or the sub-tubes 630' may comprise walls made of metal mesh or metal screen.

In FIG. 2, the circuit comprises a bypass conduit 64 that extends between the inlet 61 and the outlet 62. The conduit 64 can be equipped with a valve 65, for example a flap valve, adapted to adopt an open position and a closed position. When the valve 65 is in the closed position, the passage of fuel through the bypass conduit 64 is blocked. The passage flow rate is zero. When the valve 65 is in the open position, the fuel can flow through the conduit 64. The passage flow rate is then maximum.

The device 6 may also comprise means for cooling 8 the outlet 62. In a non-limiting way, these means 8 can comprise a thermal exchanger, fins formed in projection on a conduit connecting the outlet of the device to the ramp, etc.

The circuit 1 may also comprise a metering unit 7 allowing generally to regulate the device 6 of the invention centrally and automatically.

Figure 5:
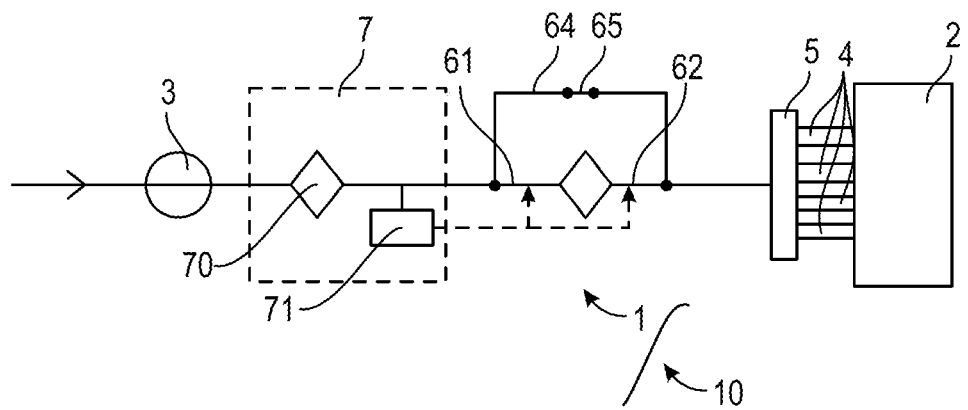
FIG. 5 is another very schematic view of a circuit according to the invention.

Thus, with reference to FIG. 5, the circuit 1 may comprise the following elements listed here in the direction of flow of the fuel from upstream to downstream:
- the pump 3 ensuring the supply of the fuel, for example from a reservoir arranged upstream of the pump 3,
- the metering unit 7 of the fuel total flow comprising a regulator 71 of the fuel flow and/or a self-cleaning filter 70 arranged upstream of the regulator 71,
- the fuel thermal treatment device 6, and
- a ramp 5 for connecting the device 6 to the injectors 4 arranged and opening onto the combustion chamber 2.

We will now describe a method for supplying fuel to the turbomachine combustion chamber 2 by means of the supply circuit 1 equipped with the device 6 of the invention.

With reference to FIGS. 2 and 5, the device 6 is supplied with a first fuel flow F1 provided directly by the pump 3 with or without regulation by the metering unit 7.

The first flow F1 splits into a second fuel flow F2 or a third fuel flow F3 at the level of the inlet 61 of the device 6. The second flow F2 passes through the bypass conduit 64 to the outlet 62 of the device when the valve 65 is in the open position. The third flow F3 passes through the chamber 60 to the outlet 62 when the valve 65 is in the closed position. The third flow F3 is heated by the heating elements 63 to generate fuel deposits within the chamber 60.

The open and closed positions of the valve 65 can be controlled by the metering unit 7, more specifically by the regulator 71, depending on a measurement parameter of the fuel flow. This parameter, such as a pressure or a flow rate, can be measured by a sensor. This sensor is configured to measure the pressure and/or the flow rate of the fuel flow either at the outlet of the pump 3 or at the inlet of the device 6 (i.e. the first flow F1).

Similarly, the metering unit 7, preferably the regulator 71, can also control the heating elements 63. This control of the elements 63 may be realized to heat the fuel when a parameter of the fuel flow provided by the pump 3 is below a predetermined threshold. This threshold may be a predetermined pressure level of the first flow F1 that is measured by the sensor.

When the turbomachine is operating (for example at full throttle, in the climb phase or during the "Cruise" mode), the valve 65 adopts the open position and the second flow F2 passing through the conduit 64 is maximum. The first measured flow F1 is thus higher than the predetermined threshold. This allows to supply fuel to the ramp 5 and the injectors 4 via the bypass conduit 64 and thus bypassing the chamber 60 of the device.

When the turbomachine is going to be stopped or in idle operation (during the approach phase of the aircraft, for example), the valve 65 adopts the closed position and the second flow F2 passing through the conduit 64 is zero. The first measured flow F1 is below the predetermined threshold. This allows the ramp 5 and the injectors 4 to be supplied after the third flow F3 has been heated in the chamber 60. In fact, the fuel passes through the tubes 630, the orifices 634, 634' and the sub-tubes 630' to be heated and freed of these reaction compounds (dissolved oxygen and sulphur-type precursors).

Preferably, the tube or the tubes 630 are heated to a temperature between 200 and 300° C., more preferably 250° C., to form the coke deposit by oxidation of the fuel. This device of the invention does not allow the tube or the tubes to be heated to a temperature higher than 400° C., in particular to avoid the pyrolysis of the fuel.

Besides, the consumption of the compounds may be generated by an electric current of the order of 5 kW in the tube or the tubes 630 through the associated electrode 632.

Specifically, the flowing of the electric current causes a local heating (e.g., to 250° C.), so as to force the fuel and these compounds to precipitate on the surface of the tube or the tubes 630 and form a coking or fuel clogging on the walls of the tube or tubes 630. In this configuration, the large oxidation surface of the fuel allows that the device does not clog up quickly. This is not the case, for example, with injectors that comprise one or more small diameter pipelines in which a coking can easily clog the injectors.

At the level of this outlet 62, the means 8 allow to cool the flow F3 leaving the chamber 60. This allows to limit the excessively high fuel temperatures at the inlet to the ramp 5 and the injectors 4 when the heating elements are used.

When the chamber 60 comprises multiple tubes 630, each tube 630 may operate independently of each other or simultaneously. In the event that the tubes 630 operate independently, the chamber 60 may comprise at least one valve and a guide element for guiding the flow of fuel entering the chamber 60 toward the active tube or tubes 630.

In this description, the device for thermal treatment of the fuel is described in a turbomachine, in particular an aircraft. The device of the invention can also be adapted in hydromechanical systems of turbomachine other than the aeronautical field.

Furthermore, it is understood from the present description that the efficiency of the device within the supply circuit is dependent on various parameters, such as the number and the dimensions of the heating elements.

The fuel thermal treatment device according to the invention provides several advantages which include in particular:
  causing the formation of fuel coke deposits upstream of the injectors,
  easily attaching and detaching from the supply circuit,
  optimizing the service life of the injectors by preventing the formation of coking,
  limiting the maintenance cost of the injectors and the combustion chamber, and
  easily adapting to the existing gas generators.

Overall, this proposed solution is simple, effective and economical to build and assemble on a turbomachine, while providing an optimal fuel supply and an improved service life of the injectors in a combustion chamber.

The invention claimed is:

1. A fuel supply circuit for a combustion chamber of a turbomachine, comprising:
  a fuel supply pump configured to provide a fuel flow at a predetermined flow rate,
  a plurality of fuel injectors,
  an injector connection line for connecting the fuel supply pump to the plurality of fuel injectors, and
  a device for thermally treating the fuel flow comprising a chamber connected to a fuel inlet connected to the fuel supply pump and to a fuel outlet connected to the injector connection line, heating elements being located in the chamber and being configured to heat the fuel flow provided by the fuel supply pump up to a predetermined temperature so as to cause a coking of the fuel flow within the chamber,
  wherein said heating elements comprise at least one perforated metal tube which comprises fuel passage orifices and which is associated with a respective heating electrode for heating the at least one perforated metal tube and thus the fuel flow passing through the at least one perforated metal tube,
  wherein the at least one perforated metal tube is formed of a plurality of metal sub-tubes nested concentrically inside each other,
  wherein each metal sub-tube is perforated and comprises the fuel passage orifices,
  wherein each metal sub-tube is heated by the respective heating electrode,
  wherein a gap between proximate walls of proximate metal sub-tubes forms a fuel passage.

2. The fuel supply circuit according to claim 1, wherein the fuel supply circuit further comprises a bypass conduit for bypassing said device, this conduit extending between the fuel supply pump and the injector connection line and allowing the fuel flow to leave the fuel supply pump and to supply the injector connection line without passing through said device.

3. The fuel supply circuit according to claim 2, wherein the bypass conduit is equipped with a valve which is configured to adopt an open position in which the fuel flow passing through the bypass conduit is a maximum, and a closed position in which said fuel flow is zero.

4. The fuel supply circuit according to claim 1, wherein the fuel supply circuit further comprises a fuel metering unit which is connected to said device and which is configured to control said heating elements.

5. The fuel supply circuit according to claim 3, wherein the fuel supply circuit further comprises a fuel metering unit which is connected to said device which is configured to control said heating elements and said fuel metering unit is configured to control the valve according to a parameter of the fuel flow provided by the fuel supply pump.

6. The fuel supply circuit according to claim 1, wherein each metal sub-tube comprises a wall formed by a metal mesh or metal screen.

7. The fuel supply circuit of claim 6, wherein at least one seal and/or dielectric seal is arranged between said metal meshes or metal screens of the plurality of metal sub-tubes.

8. The fuel supply circuit according to claim 2, wherein the device comprises means for cooling the fuel flow leaving the chamber or the bypass conduit.

9. The fuel supply circuit according to claim 1, wherein the orifices of the at least one perforated metal tube have a diameter between 0.1 and 1 mm.

10. The fuel supply circuit according to claim 1, wherein the heating elements are configured to provide a heating temperature of between 200 and 300° C.

11. The turbomachine for an aircraft, comprising the fuel supply circuit as defined in claim 1.

12. A method for supplying fuel to the combustion chamber of the turbomachine by the fuel supply circuit according to claim 1, the method comprising a step of controlling the heating elements to heat the fuel flow only when a parameter of the fuel flow provided by the fuel supply pump is below a predetermined threshold.

13. The fuel supply circuit according to claim 1, wherein the plurality of metal sub-tubes are connected to each other in a fuel-tight manner by at least one seal.

14. The fuel supply circuit according to claim 1, wherein the respective heating electrode is arranged in a center of the at least one perforated metal tube and connected to the plurality of metal sub-tubes.

* * * * *